United States Patent
Hui et al.

(10) Patent No.: US 11,326,952 B2
(45) Date of Patent: May 10, 2022

(54) PROCESS AND SYSTEM FOR COLOUR GRADING FOR DIAMONDS

(71) Applicant: Goldway Technology Limited, Hong Kong (HK)

(72) Inventors: Koon Chung Hui, Pak Shek Kok (HK); Ka Wing Cheng, Pak Shek Kok (HK); Wing Chi Tang, Pak Shek Kok (HK)

(73) Assignee: Goldway Technology Limited, Hong Kong (HK)

( * ) Notice: Subject to any disclaimer, the term of this patent is extended or adjusted under 35 U.S.C. 154(b) by 0 days.

(21) Appl. No.: 16/942,687

(22) Filed: Jul. 29, 2020

(65) Prior Publication Data

US 2021/0033465 A1    Feb. 4, 2021

(30) Foreign Application Priority Data

Jul. 29, 2019 (HK) .................. 19127401.8

(51) Int. Cl.
*G01J 3/50* (2006.01)
*G06T 7/90* (2017.01)
(Continued)

(52) U.S. Cl.
CPC ............... *G01J 3/50* (2013.01); *G01N 21/87* (2013.01); *G06T 7/0002* (2013.01); *G06T 7/90* (2017.01);
(Continued)

(58) Field of Classification Search
CPC . G01J 3/50; G06T 7/90; G06T 7/0002; G06T 2207/20081; G06T 2207/20084;
(Continued)

(56) References Cited

U.S. PATENT DOCUMENTS 4,482,245 A * 11/1984 Makabe ................. G01J 3/0251
356/30
4,907,875 A * 3/1990 Bowley .................. G01N 21/87
356/30
(Continued)

FOREIGN PATENT DOCUMENTS

CN      101539530 A      9/2009
CN      103090973 A      5/2013
(Continued)

OTHER PUBLICATIONS

Koll, Hermann, Examiner, European Patent Office, "Extended European Search Report" in connection with related European Patent App. No. 20188438.4, dated Jan. 13, 2021, 14 pgs.
(Continued)

*Primary Examiner* — Xuemei G Chen
(74) *Attorney, Agent, or Firm* — Kolisch Hartwell, P.C.

(57) ABSTRACT

A process is operable using a computerized system for grading the colour of a diamond using a pre-trained neural network for determination of a colour grading. The computerized system includes an optical image acquisition device, a pre-trained neural network and an output module operably interconnected together via a communication link. The process includes: (i) acquiring via an optical image acquisition device one or more optical image of at least a portion of a diamond; and (ii) in a pre-trained neural network, providing a regressive value associated with the colour grade of the diamond.

23 Claims, 6 Drawing Sheets

(51) Int. Cl.
*G01N 21/87* (2006.01)
*G06T 7/00* (2017.01)
(52) U.S. Cl.
CPC ............... *G01N 2201/062* (2013.01); *G06T 2207/20081* (2013.01); *G06T 2207/20084* (2013.01)
(58) Field of Classification Search
CPC . G06T 2207/10024; G06T 7/11; G01N 21/87; G01N 2201/062; G01N 2021/8887; G01N 2021/8883; G06K 9/4652; G06K 9/4619; G06K 9/6267; G06N 3/0454; G06N 3/08; G06V 10/449; G06V 10/56; G06V 10/82
See application file for complete search history.

(56) References Cited

U.S. PATENT DOCUMENTS

| | | | | |
|---|---|---|---|---|
| 6,304,853 | B1* | 10/2001 | Malnekoff | G06Q 30/0641 |
| | | | | 705/306 |
| 6,980,283 | B1* | 12/2005 | Aggarwal | G01N 21/87 |
| | | | | 356/30 |
| 7,388,656 | B2* | 6/2008 | Liu | G01J 3/462 |
| | | | | 356/30 |
| 8,878,145 | B1* | 11/2014 | Liu | G01N 21/87 |
| | | | | 250/461.1 |
| 10,548,377 | B1* | 2/2020 | Weissman | G06Q 30/018 |
| 2005/0103840 | A1 | 5/2005 | Boles | |
| 2005/0190356 | A1* | 9/2005 | Sasian | G01N 21/01 |
| | | | | 356/30 |
| 2006/0098187 | A1* | 5/2006 | Claus | G01N 21/87 |
| | | | | 356/30 |
| 2008/0204705 | A1* | 8/2008 | Liu | G01N 21/87 |
| | | | | 356/30 |
| 2009/0182520 | A1* | 7/2009 | Luxembourg | G01N 33/381 |
| | | | | 702/81 |
| 2012/0007971 | A1* | 1/2012 | Schnitzer | G06T 15/08 |
| | | | | 348/61 |
| 2015/0187065 | A1* | 7/2015 | Horiuchi | G06T 7/0004 |
| | | | | 348/125 |
| 2016/0232432 | A1 | 8/2016 | Regev | |
| 2016/0290925 | A1* | 10/2016 | Takahashi | G01N 21/6456 |
| 2016/0290930 | A1* | 10/2016 | Takahashi | G01N 21/255 |
| 2018/0071788 | A1* | 3/2018 | Anup | G01N 21/88 |
| 2018/0082116 | A1* | 3/2018 | Navot | G06K 9/00577 |
| 2018/0136141 | A1* | 5/2018 | Deng | G01J 3/52 |
| 2018/0156735 | A1* | 6/2018 | Fitch | G01J 3/0251 |
| 2018/0172599 | A1* | 6/2018 | Wang | G01N 21/6489 |
| 2018/0247399 | A1* | 8/2018 | Parikh | G06T 7/62 |
| 2018/0300546 | A1* | 10/2018 | Schaefer | G06K 9/00577 |
| 2018/0372647 | A1* | 12/2018 | Brenner | G01N 21/87 |
| 2019/0213757 | A1* | 7/2019 | Cheng | G01N 21/87 |
| 2020/0050834 | A1* | 2/2020 | Niskanen | G06K 9/2063 |
| 2020/0333257 | A1* | 10/2020 | Cheng | G06T 7/0004 |
| 2020/0371042 | A1* | 11/2020 | Sivovolenko | G01N 33/381 |
| 2021/0003510 | A1* | 1/2021 | Raichelgauz | G01N 21/87 |
| 2021/0116394 | A1* | 4/2021 | Pinhasi | G01N 22/02 |
| 2021/0131974 | A1* | 5/2021 | Ioffe | H04N 5/23299 |

FOREIGN PATENT DOCUMENTS

| | | |
|---|---|---|
| CN | 107787449 A | 3/2018 |
| CN | 107909103 A | 4/2018 |
| CN | 108009564 A | 5/2018 |
| CN | 108027328 A | 5/2018 |
| CN | 109991230 A | 7/2019 |
| EP | 3505917 A1 | 7/2019 |
| WO | 2019141200 A1 | 7/2019 |

OTHER PUBLICATIONS

Lopez-Gonzalez, G. et al., "Quatemion Support Vector Classifier", Big Data Analytics in the Social and Ubiquitous Context: 5th International Workshop on Modeling Social Medica, MSM 2014, 5th International Workshop on Mining Ubiquitous and Social Environments, Muse 2014 and First International Workshop on Machine Le, ISBN: 978-3-642-17318-9, Nov. 2, 2014, 8 pgs.

Ren, Zhiguo et al., "Diamond Color Grading Based on Machine Vision", 2009 IEEE 12th International Conference on Computer Vision Workshops, ICCV Workshops, (c) 2009, pp. 1970-1976.

Xie, Jianjun, Authorized Officer, National Intellectual Property Administration, PRC, "International Search Report" in connection with related International Application No. PCT/CN2020/105430, dated Sep. 29, 2020, 12 pgs.

\* cited by examiner

PROCESS AND SYSTEM FOR COLOUR GRADING FOR DIAMONDS

TECHNICAL FIELD

The present invention relates to a system and a process for ascertaining the colour of a gemstone. More particularly, the present invention provides a system and a process for ascertaining the colour of a diamond.

BACKGROUND OF THE INVENTION

Diamonds are a key component utilized in luxury goods, in particular in articles of jewellery, and can have a very great value. The value of a diamond depends on several physical properties of the diamond.

There are four globally and accepted standards utilized to assess the quality of a diamond, typically known as the 4C's, which are Clarity, Colour, Cut and Carat Weight.

For a diamond, with the exception of colour of a diamond in the event of which may have a particular or fancy colour, the value of a diamond is highly dependent on what is known as its colourlessness. The more colourless the diamond, the higher the value.

By way of example, the Gemological Institute of America (GIA) has a colour grade scale from D to Z, for which the D grade denotes a diamond which is completely colourless, and ranging to a Z grade which denotes a diamond having a significant amount of unwanted colour.

Shown below is the Gemological Institute of America (GIA) colour scale, against which a colour grading is applied, with the grades shown from colourless to light from left to right.

GIA Color Scale

| D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|
| COLORLESS | | | NEAR COLORLESS | | | | FAINT | | | | | VERY LIGHT | | | | | LIGHT | | | | | |

Although the human visual recognition of a different diamond colour is not particularly sensitive in particular in relation to diamonds of similar grades, only a slightly change in colour can significantly affect the value of the diamond.

Several factors contribute to the colour of a diamond, the most common and important factor being impurities within a diamond.

During the formation process of diamonds, impurities can be easily incorporated into a diamond. Nitrogen is the most common impurity found in natural diamonds, which produces an unwanted yellow colour. The higher the nitrogen content in a diamond, the deeper the colour and hence the lower colour grade the stone is.

Boron can also affect diamond the colour of a diamond, but is less common. Diamonds with boron impurity shows light blue colour. There are other impurities also affect diamond colour, however they are rare.

Apart from impurities, vacancy defects within a diamond also contribute to colour of a diamond. There are different forms of vacancies, such as isolated vacancy, multivacancy complex, and vacancy combining with impurities, for example.

In some diamonds, due to the ambient pressure conditions during the formation process deep in the earth, the carbon atoms may not form ideal tetrahedral structures, and the tetrahedral structures may be deformed. Such crystal deformation remains in natural diamond can also cause colour changes of a diamond. For the assessment on the colour of a diamond, the most accepted industry standard and practice to determine a diamond's colour is by trained human eyes utilised standardized colour scales.

Using the GIA colour grading system as an example, colour grading personnel are trained for several months utilising standard master stones from a master stone set with assorted colour grades. Moreover, during the colour grading process, a diamond under assessment is compared with the master stones side by side in a controlled environment.

The controlled environment is a standard light box with a white tile to place behind the master stones, and testing diamond as a backdrop. Under this standardized environment, the colour of a diamond can be graded by referring it to the master stone with the nearest colour.

A diamond is typically viewed from below at about 45 degrees to the pavilion, with a colour grader looking primarily at the pavilion of the diamond and in a direction towards the table of the diamond.

Repetitive training of colour graders is applied, with a view so that different graders can reproduce the same assessment results, with a view to providing uniformity and consistency between colour grading personnel.

Although such a colour grading process is extensively used and under this strict colour grading procedures, the reliability and repeatability of the colour grading methodology are still prone to inconsistencies, and such inconsistencies can cause incorrect grading which can adversely impact upon the value of a diamond.

OBJECT OF THE INVENTION

It is an object of the present invention to provide a system and a process for ascertaining the colour of a gemstone, in particular a diamond, which overcomes or at least partly ameliorates at least some deficiencies as associated with the prior art.

SUMMARY OF THE INVENTION

In a first aspect, the present invention provides a process operable using a computerized system for grading the colour of a diamond using a pre-trained neural network for determination of a colour grading, the computerized system including an optical image acquisition device, a pre-trained neural network and an output module operably interconnected together via a communication link, said process including the steps of:

(i) acquiring via an optical image acquisition device one or more optical image of at least a portion of a diamond, wherein the one or more optical image are acquired at a predetermined angle of with respect to the central axis of the diamond wherein the central axis extends normal to the table and through the apex of the pavilion of the diamond and in a direction of towards the table, and wherein the one or more optical image is acquired in an environment having a predetermined constant light level;

(ii) in a pre-trained neural network, providing a regressive value associated with the colour grade of said diamond based on the one or more optical images of at least a portion of said diamond acquired during step (i);

wherein the pre-trained neural network has been pre-trained utilising optical images acquired from a plurality of diamonds each having a pre-assigned colour grade assigned thereto, wherein said plurality of diamonds includes a plurality of diamonds of each pre-assigned colour grading, wherein of one or more optical images is acquired by an optical image acquisition device of at least a portion of each diamond of said plurality of diamonds at the same facets and at the same predetermined angle of with respect to the central axis of the diamond wherein the central axis extends normal to the table and through the apex of the pavilion of the diamond as that of (i) and in an environment having a predetermined constant light level the same as that as (i); and (iii) from an output module, providing a colour grade to the diamond of (i) by correlating the regression value from (ii) to a colour grade.

The one or more optical image of at least a portion of a diamond may be acquired in a direction of towards the table of the diamond in step (i), and wherein the pre-trained neural network has been pre-trained utilising optical images acquired from said plurality of diamonds each having a pre-assigned colour grade assigned thereto in a direction of towards the table of the diamond.

The one or more optical image of at least a portion of a diamond may be acquired in a direction of towards the pavilion of the diamond in step (i), and wherein the pre-trained neural network has been pre-trained utilising optical images acquired from said plurality of diamonds each having a pre-assigned colour grade assigned thereto in a direction of towards the pavilion of the diamond.

The one or more optical image of at least a portion of a diamond may be acquired in a direction of towards the table of the diamond and is acquired in a direction of towards the pavilion of the diamond in step (i), and wherein the pre-trained neural network has been pre-trained utilising optical images acquired from said plurality of diamonds each having a pre-assigned colour grade assigned thereto in a direction of towards the table of the diamond and in a direction of towards the pavilion of the diamond.

Preferably, the one or more images of the diamond of (i) and the one or more images of the plurality of the diamonds of (ii) is the entire view of the diamond within the field of view.

The one or more images of the diamond of (i) and the one or more images of plurality of diamonds of (ii) may be acquired at an angle in the range of from zero degrees to 90 degrees with respect to said central axis.

The plurality of the one or more images of the diamond of (i) and the one or more images of the plurality of diamonds of (ii) are preferably acquired about said central axis.

The one or more images of the diamond of (i) and the one or more images of the plurality of diamonds of (ii) may be acquired at equally spaced angles about said central axis.

The one or more images of the diamond of (i) and the one or more images of the plurality of diamonds of (ii) may be acquired of the pavilion facets of the diamonds.

The one or more images of the diamond of (i) and the one or more images of the plurality of diamonds of (ii) may be acquired of the table facet of the diamonds.

The one or more images of the diamond of (i) and the one or more images of the plurality of diamonds of (ii) may be acquired of the table facet of the diamonds.

The one or more images of the diamond of (i) and the one or more images of the plurality of diamonds of (ii) may be acquired an angle in the range of from zero degrees to 90 degrees with respect to said central axis.

The one or more images of the diamond of (i) and the one or more images of the plurality of diamonds of (ii) may be acquired at an angle of inclination in the range of from 40 degrees to 50 degrees with respect to the central axis.

The one or more images of the diamond of (i) and the one or more images of the plurality of diamonds of (ii) may be acquired at an angle of inclination of about 45 degrees with respect to the central axis.

The one or more images of the diamond of (i) and the one or more images of the plurality of diamonds of (ii) may be acquired within a system of a pair of integrating spheres.

A light source providing said predetermined light level is selected from the group including an LED (Light Emitting Diode) light source, a Xeon lamp light source, and incandescent light source, and fluorescent lamp light source, a solar simulator or the like.

The pre-assigned colour grades of the plurality of diamonds are standard reference diamonds corresponding to a pre-existing colour grading system. The pre-existing colour grading system may be the Gemological Institute of America (GIA) colour grading system.

The one or more images of the diamond of (i) are preferably are resized and cropped prior to being received by the neural network such that the images have a constant size and resolution to each other.

The one or more images of the plurality of diamonds of (ii), are preferably resized and cropped prior to being received by the neural network such that the images have a constant size and resolution to each other.

Preferably, flat field correction is utilized in the acquisition of the one or more images of the diamond of (i) and the one or more images of the plurality of the diamonds of (ii)

In a second aspect, the present invention provides a computerized system for grading the colour of a diamond using a pre-trained neural network for determination of a colour grading, the computerized system including:

an optical image acquisition device for acquiring one or more optical image of at least a portion of a diamond, wherein the one or more optical image are acquired at a predetermined angle of with respect to the central axis of the diamond wherein the central axis extends normal to the table and through the apex of the pavilion of the diamond and in a direction of towards the table, and wherein the one or more optical image is acquired in an environment having a predetermined constant light level;

a pre-trained neural network for receiving one or more optical image of at least a portion of a diamond from the optical image acquisition device, and providing a regressive value associated with the colour grade of said diamond based on the one or more optical images of at least a portion of said diamond;

wherein the pre-trained neural network has been pre-trained utilising optical images acquired from a plurality of diamonds each having a pre-assigned colour grade assigned thereto, and wherein said plurality of diamonds includes a plurality of diamonds of each pre-assigned colour grading; and wherein of one or more optical images is acquired by an optical image acquisition device of at least a portion of each diamond of said plurality of diamonds at the same facets and at the same predetermined angle of with respect to the central axis wherein the central axis extends normal to the table and through the apex of the pavilion of the diamond and in a direction of towards the table as that of (i) and in an environment having a predetermined constant light level the same as that as when the one or more optical image of at least a portion of a diamond is acquired; and an output module in communication with the pre-trained neural network, for providing a colour grading to the diamond of by correlating said regression value to a colour grading.

The optical image acquisition device may be inclined at an angle in the range of from zero degrees to 90 degrees with respect to the central axis. The optical image acquisition device may be inclined at an angle of about 45 degrees with respect to the central axis.

The optical image acquisition device is preferably located at a distance of in the range of 100 mm and 300 mm from the diamond, and may be located at a distance of about 200 mm from the diamond.

The system may comprise at least one light source for providing said predetermined constant light level is of colour temperature 6500K. The light source may be selected from the group including an LED (Light Emitting Diode) light source, a Xeon lamp light source, and incandescent light source, and fluorescent lamp light source, a solar simulator or the like.

The system may further comprising system of a pair integrating spheres, wherein the integrating spheres comprised of two integrating spheres in optical communication with each other at aperture region in which the diamond is located when the one or more images of the diamond is acquired, and wherein the diamond is located at an aperture interconnecting each sphere of the integrating sphere system.

The system may further comprise a rotational platform rotatable about said central axis and within the system of integrating spheres, wherein the rotational platform provides for rotation of the diamond about the central axis such that a plurality of optical images of the diamonds can be acquired by the optical image acquisition devices. The optical image acquisition device may be a digital camera.

The optical image acquisition device may be disposed within a first sphere of the two integrating spheres and inclined towards said aperture. The optical image acquisition device may be disposed within a second sphere of the two integrating spheres and inclined towards said aperture.

In a third aspect, the present invention provides a report indicative of the grading the colour of a diamond, wherein the colour grading of the diamond has been provided by the process according to the first aspect.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

DETAILED DESCRIPTION OF THE DRAWINGS

Figure 1:
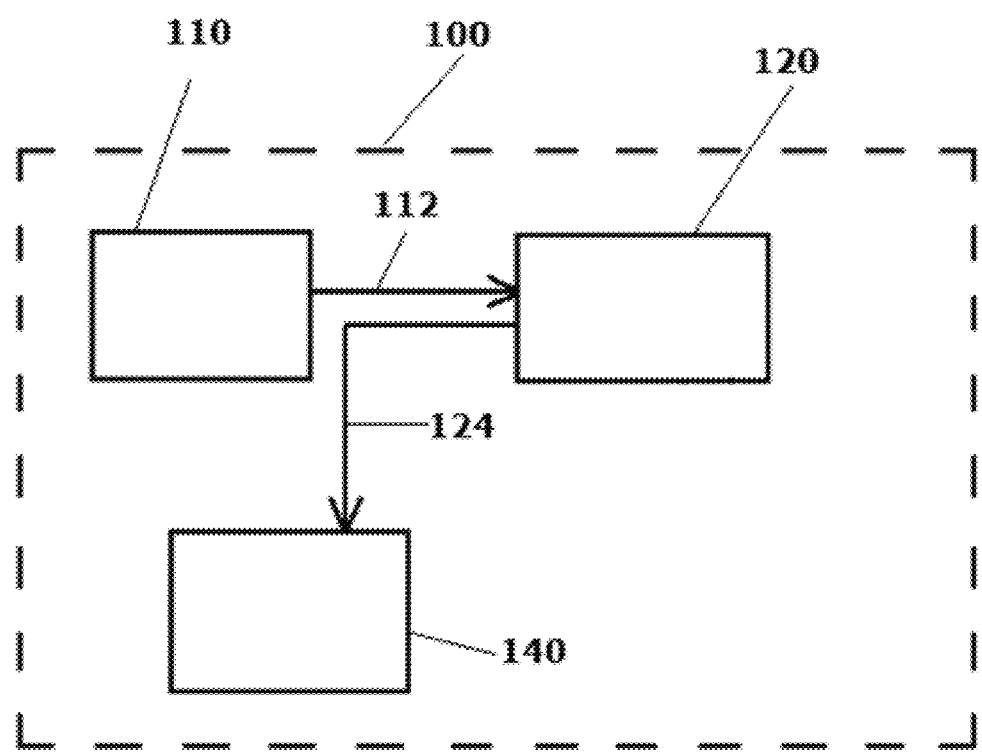
FIG. 1 shows a schematic represent of a first embodiment of a system according to the present invention.

The present inventors have identified shortcomings in the manner in which colour grading of diamonds is performed, and upon identification of the problems with the prior art, have provided a system and process which overcomes the problems of the prior art, and provides a system and process for colour grading of gemstones, in particularly diamonds, which is more consistent and reliable.

1. Identified Problems in the Art

Problems identified by the present inventors include as follows:

1.1 Intrinsic Factors—Reference Master Stones

For the standard reference of colour grades, the master stones are required to be with very high accuracy and repeatability among different sets. As it is very difficult to select master stones from natural diamonds in large amounts matching the standard colours and other physical requirements, the master stones can be real or alternatively synthetic diamonds, zirconia or other materials considered appropriate. Regardless of the material which the master stones are formed from, they must be of the same size and of the same cut within the same set, for effective comparative purposes.

However, as diamonds requiring colour grading inherently have different sizes, in order for an appropriate comparison to be made by a diamond grader, a master stone set with similar sizes to the diamond being assessed should be used so as to reduce optical comparison error.

Inherently, it is very expensive and commercially impractical to have sets of master stones covering a range so as to cover all sizes of diamonds for assessment.

Further and more importantly, each master stone of a grading set must be homogenously saturated with the specific standard colour in order that a best comparison may be made between a stone to be graded and the reference stone of the grading set.

The accuracy and usability of master stones are not only applicable to different sets of master stones, but also the same sets of master stones at different points in time when assessment is made. As such, the colour of the master stones must be permanent and without any changes over time, otherwise it is necessary to provide useable lifetimes to the master stones.

After the expiration of the usable or serviceable lifespan of a master stone, there is no guarantee that the colour will remain stable, and consequently no guarantee as to the accuracy and repeatability of colour grading assessment.

All of the above-mentioned issues affect accuracy and repeatability in colour grading, and give rise to high technical difficulties and hence high production cost of preparation of master stone sets for colour grading.

1.2 Extrinsic Factors—Environmental Issues

Even with the most reliable master stones and within the guaranteed lifetime such that variance due to intrinsic factors is minimised, inherently the reliability and repeatability due to colour grading and assessment being done using human eyes, this will still pose an issue to the correct colour grading of a diamond.

Colour perception is a common psychological effect on human colour vision. Any differences or variations in the background colour and the lighting conditions, can contribute to errors being induced in colour grading of gemstones.

As such, environmental parameters may also have a significant effect on colour grading.

1.3 Extrinsic Factors—Human Error Inconsistency and Perception

Due to the physiological effect of human being's vision, tiredness and different judgements on the same diamond may also be made before and after assessments on many different stones, even by the same colour grader person.

As such, assessment of colour of the same diamond by the same person at a different time, may result in different assessment and produce colour grade deviation.

Even with strictly controlled environment and a well-rested person, the physical properties of a diamond can also affect the colour grading. The cut of a diamond can introduce physical effect on colour judgement and assessment.

The very high refractive index of diamonds causes total internal reflection and dispersion of light, which can also affect accurate colour grading by a person. The cut varies between different diamonds so there are no corresponding master stones for every diamond cut for fair comparison.

Therefore, under standardized training and assessment procedures, professional colour graders still face difficulty for the reliability and repeatability because of the psychological, physiological, and physical effects.

1.4 Physical Factors

There exist other physical factors affecting diamond colour grading from the pavilion view of the prior art, leading to an insufficient colour grading process.

One such factor is that the light directly from the white light source is reflected by the pavilion facets outside the diamond. This reflected light can affect the accuracy of colour grading as the facets reflecting the light appears paler in colour.

Furthermore, when viewing pavilion facets, multiple facets are typically seen which are at different angles to each other, causing different impressions of colour during optical assessment. Apart from round brilliant cut diamonds, diamonds can also be cut in different fashions, such as Princess, Oval, Marquise, Pear shaped, Cushion, Emerald, Asscher, Radiant and Heart shaped cuts and the like.

2. Present Invention

To provide a repeatable and reliable colour grading, the present invention provides a superior new and innovative process for assessment and grading of colour of a diamond with respect to colour grading processes of the prior art.

In order to provide an improved colour grading system for diamonds, which overcomes deficiencies associated with prior art as identified by the present inventors, the present inventors have provided a system and process which overcomes these problems, and which can be used for providing a colour grading based on existing colour grading systems such as that of GIA.

The present invention utilises the following:
 (i) Image pre-processing of diamonds;
 (ii) A trained neural network; and
 (iii) Colour domain processing.

2.1 Pre-Processing:

In embodiments of the invention, the pre-processing for colour grading, both for training and for assessment, may involves several steps. The pre-processing applies to photos of pavilion or table facet, typically with an angle to the table. The preprocessing steps involve as follows:

2.1.1 Resize and Cropping

Images of the diamonds are cropped from the background at the peripheries.

Different diamonds may have different sizes. Images of which are therefore resized to achieve a constant size and resolution with each other.

Although resizing and cropping is preferable, and may not necessarily be embodied in every aspect of the invention 2.1.2 Flat-Field Correction Flat-field correction is a technique to correct image artifacts caused by variation of pixel sensitivity. The variation of sensitivity usually caused by 2 factors.

The first is the pixel performance in electronic level. Since it is impossible to perfectly engineer every pixel on the camera detector to be exactly the same, there exists pixel to pixel variation in sensitivity on ever camera detector.

The second usual cause to the variation is the optical design. The combination of lens in a camera can cause brightness variation of the image. The most common case is dimmer perimeter of an image.

The variation in pixel sensitivity can be corrected by taking a plurality of flat-field image F with an empty and clean background under the working lighting conditions.

A dark field image D can also be taken with the camera covered to block all light. The dark field image can sometimes be omitted because it normally has low pixel values, especially for a high-quality camera.

The flat-field correction can then be done with the raw image R to produce a corrected image C with a factor m, which is the image averaged value of (F−D) or a targeted value.

$$C=((R-D)*m)/((F-D))$$

Flat field Correction is an important aspect of the present invention, as colour is an optical impression, and obviation of its impact assists in colour assessment reliability.

Advantages of the Flat field Correction include:
 (i) providing a homogeneous darkness/brightness perception within the same image to avoid artifacts such as dark corners;
 (ii) avoids variations of colour temperatures of images when using image acquisition devices with different sensors; and
 (iii) avoid inhomogeneity of images due to the sensitivity of each pixel of the sensor.

2.2 Neural Network Processing 2.2.1 Regression

The pre-processed images are preferably input into convolutional neural network (CNN) for colour training and prediction.

Since colour of an object is a continuous property, neural network colour grading is not as simple as a classical classification problem.

In the traditional computer vision application, colour can be considered as a continual spectrum. For gemstones such as diamonds, for example, there are stones with colour E (for example in reference to the GIA colour grading scale) but quite close to the next colour grade F.

In the case of neural network colour grading as provided in the present invention, an image is input into the CNN to capture the abstract characteristics from the colour images.

The characteristics are analyzed by a regression method to take care or accommodate for the continual property of colour. The output of the regression is a continual value instead of discrete grade. During training, diamonds with a known or predetermined colour grading are used, for example from a color grading set, so as to train the CNN.

2.2.2 Voting Method

Since the colour distribution of a gemstone may not be homogenous in the gemstone, it may appear to have a different colour at different rotation angles when viewed. Hence, the neural network colour evaluation of a gemstone can give different results at different rotation angle of the gemstone.

In traditional AI (artificial intelligence) classification problems, the voting method is used in general for determination of the most suitable or possible result.

However, the present inventors have determined that in the case of gemstone, gemologist grade the colour of a gemstone by general consideration instead of voting for the colour at different angles.

Therefore, in order to best replicate the real situation of colour grading, regression methods and statistical methods such as averaging of colour results from different angles is used instead of voting method.

2.3 Data Interpretation

In accordance with the present invention, as colour is a continuum, Colour Domain is utilized in the present invention.

In the present invention, combining the regression and average (or other similar and appropriate statistical methods), the regression values from different angles of a diamond are combined by averaging to give a final regression value.

The regression value means a gemstone's position between different colour grades.

By way of example below, 1.0 represents colour E and 2.0 represent colour F.

A gemstone with regression value 1.3 means that it has a colour E because it is closer to 1.0.

This regression value also means that the gemstone has a colour near to colour F but not near colour D.

For this, a new concept of "colour domain" is introduced, which is in addition to a system such as the GIA colour grading system.

A gemstone with regression values between 2 consecutive integers is considered to be the same colour domain.

Such a system provides enhanced colour grading and meaningfulness of colour grading, for comparative purposes.

|  | Regression Value | | | | | |
| --- | --- | --- | --- | --- | --- | --- |
|  | <0.5 | [0.5, 1.5) | [1.5, 2.5) | [2.5, 3.5) | [3.5, 4.5) | [4.5, 5.5) |
| Colour Grade | D | E | F | G | H | I |

Referring to FIG. 1, there is shown a schematic represent of a first embodiment of a system 100 according to the present invention.

The system 100 includes at least one optical image acquisition device 110 in communication 112 with a neural network 120. An output device 140 is provided, which is in communication 124 with the neural network 120.

The optical image acquisition device 110 is preferably a digital camera device of CCD, which allows for acquisition of an optical image of the table of a diamond.

The system 100 may be provided as a single unit and with the integers of the system 100 being provided as an integral device.

Alternatively, the integers of the system 100 can be provided separately, and the neural network 120 being provided either in an adjacent location to, for example, a touch sensitive input device and visual display unit 140 or provided at a remote location and in communication with the touch sensitive input device and visual display unit 140 by way of a telecommunications network.

Figure 2:
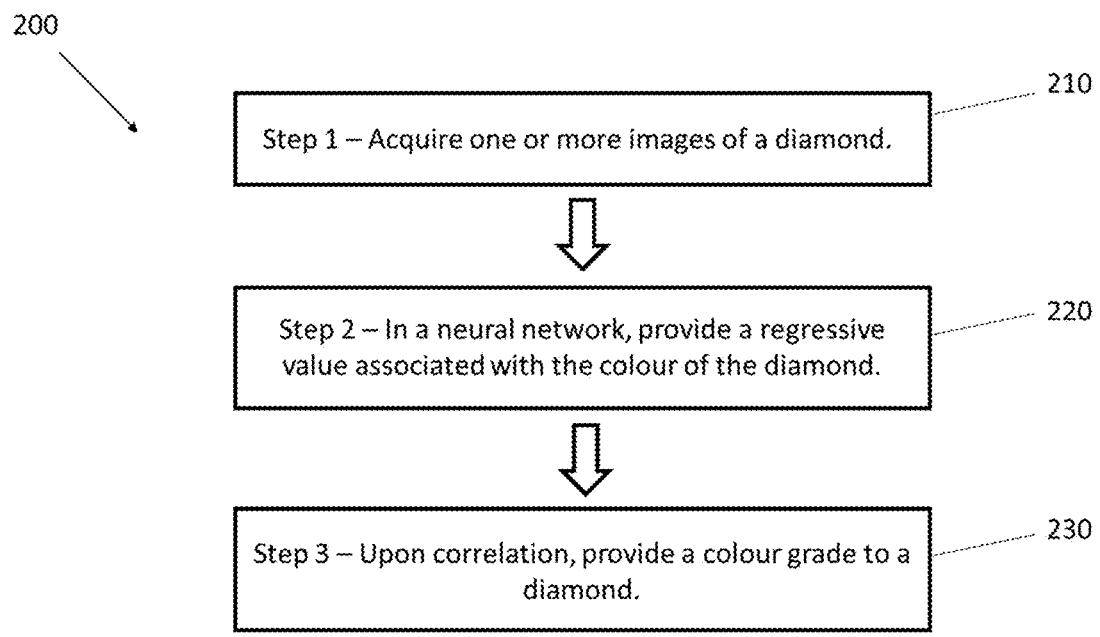
FIG. 2 shows a flow chart of the process according to the present invention.

Referring now to FIG. 2, there is shown a flow chart 200 of the process according to the present invention.

The process of the present invention is operable using a computerized system such as those as shown and described in reference to FIG. 1.

The process and as implemented in a computerized system, provides for grading the colour of a diamond.

A computerized system in which the process is embodied, includes an optical image acquisition device, a neutral network, and an output module.

The process includes the steps of:

First Step—The first step (210) includes acquiring one or more optical images of a diamond for which the colour grading thereof is to be determined.

The optical image is acquired using an image acquisition device, such as a digital camera or CCD at a predetermined angle of inclination to the central axis extending normal to the table and through the apex of the pavilion of the diamond and in a direction of towards the table.

The optical image is acquired in an environment having a predetermined constant light level, such as within a system of two communicating integrating spheres. The optical image can be acquired from either side of the diamond, the pavilion facets of the diamond or the table of the diamond.

Second Step—In the second step (220), in a pre-trained neural network, providing a regressive value associated with the colour grade of said diamond based on the one or more optical images of at least a portion of said diamond acquired during step (i);

The pre-trained neural network has been pre-trained utilising optical images acquired from a plurality of diamonds each having a pre-assigned colour grade assigned thereto.

The plurality of diamonds includes a plurality of diamonds of each pre-assigned colour grading, such as GIA grading, and using a set of colour grading diamonds.

One or more optical images is acquired by an optical image acquisition device of at least a portion of each diamond of said plurality of diamonds at the same facets and at the same predetermined angle of with respect to the central axis extending normal to the table and through the apex of the pavilion of the diamond and in a direction of towards the table as that of (i) and in an environment having a predetermined constant light level the same as that as (i).

Third Step—The third step (230), from an output module, providing a colour grade to the diamond of Step 1 by correlating the regression value from Step 2 to a colour grade.

As such, the present invention present invention provides for the generation of a report which is indicative of the grading the colour of a diamond, whereby the colour grading of the diamond has been provided by the process according to the present invention.

Such a report which correlates to a particular diamond, can be used for determining the value of the diamond, and the grading as provided by the report may be utilised commercially in respect of supply, wholesaling and retail sales of the diamond.

Figure 3:
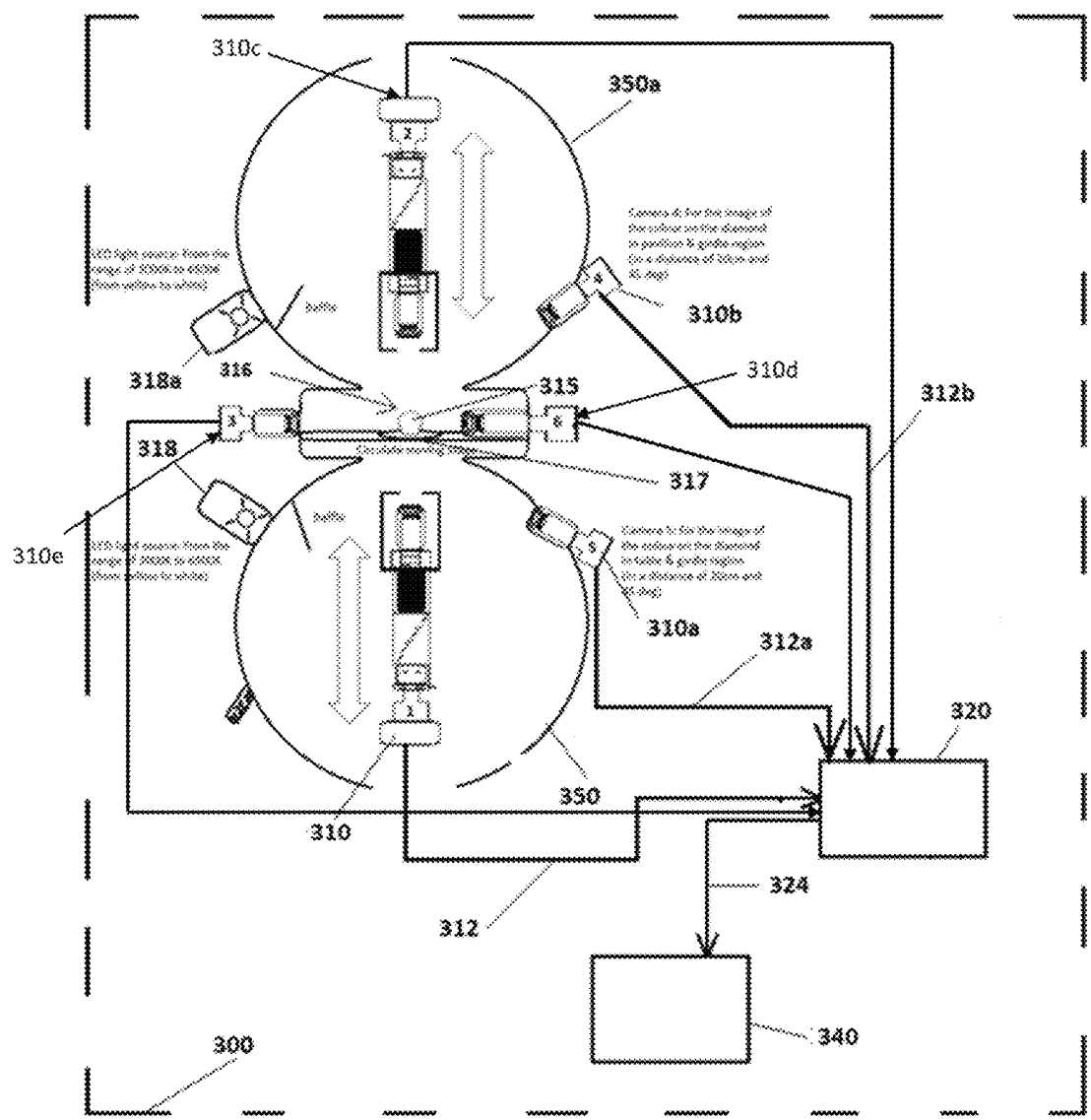
FIG. 3 shows a schematic representation of an embodiment of a system in accordance with the present invention.

Referring to FIG. 3, there is shown a schematic representation of a system 300 in accordance with the present invention. The system 300 includes two first optical image acquisition devices 310 and 310a in communication 312, 312a with a neural network 320.

An output device 340 is provided, which is in communication 324 with the neural network 320.

The two first optical image acquisition devices 310 and 310a allow images of the table of diamond 315, which has its table facing downwards, at 90 degrees by image acquisition device 310 and at an inclination by image acquisition device 310a.

As such, in the present embodiment, images at two angles to the table facet of the diamond 315 may be acquired.

Alternatively, in other embodiments, the angle of inclination of the diamond 315 may be varied by a way of a holder for the diamond 315 so as to alter the viewing acquisition angle.

The system 300 includes a system of integrating spheres comprised of two integrating spheres 350 and 350a in optical communication with each other at aperture region 316, in which the diamond 315 is located when the optical image is acquired.

The first optical image acquisition devices 310 and 310a are preferably digital camera devices, which allow for acquisition of an optical image of a diamond 315 at 90 degrees by acquisition device 310, and at inclined at an angle for example 45 degrees acquisition device 310a with respect to the central vertical axis of the diamond 315.

The optical image acquisition devices 310 and 310a are located at a distance of about 200 mm from the diamond 315, or less, or more.

The system 300 includes two light source 318 and 318a, providing said predetermined constant light level which is of colour temperature 6500K within each integrating sphere 350 and 350a. The light sources can be selected from the group including an LED (Light Emitting Diode) light source, a Xeon lamp light source, and incandescent light source, and fluorescent lamp light source, a solar simulator or the like, so as to provide a predetermined constant light level within the spheres 350 and 350a of colour temperature 6500K.

The system 300 further includes a rotational platform 317 rotatable about said central axis of the diamond 315 and within the system of integrating spheres 350 and 350a, wherein the rotational platform 317 provides for rotation of the diamond 315 about the central axis such that a plurality of optical images of the diamonds can be acquired by the optical image acquisition devices 310 and 310a.

Optionally, a second optical image acquisition device 310b a second optical image acquisition device is also provided for acquiring at least a second optical image, wherein the second optical image is an optical image of the pavilion of the diamond 315.

In other embodiments, the images may be acquired by views of the pavilion of the diamond 315 for assessment of colour, and colour assessment conducted by way of views of the diamond.

Additional optical image acquisition device 310c provides for acquisition of images of a diamond from above the pavilion, which is in communication with neural network 320.

In other embodiments, when diamond colour is assessed, either by way of the table or pavilion or combinations thereof, one or more further optical image acquisition devices 310d and 310e may be utilised for acquiring images of the diamonds as a side view, which are in communication with neural network 320.

As will be understood, for colour assessment, either the table or the pavilion or both the table and the pavilion of a diamond may be utilised in the present invention for colour assessment, and the neural network trained accordingly via images of either the table or the pavilion or both the table and the pavilion of known colour graded diamonds.

As will also be understood multiple sets of pre-graded diamonds may be used for training and of different sizes also.

The reference data of diamonds by which the neural network is trained is preferably standard reference diamonds of a master set, for example corresponding to a pre-existing colour grading system such as the Gemological Institute of America (GIA) colour grading system for example.

Figure 4A:
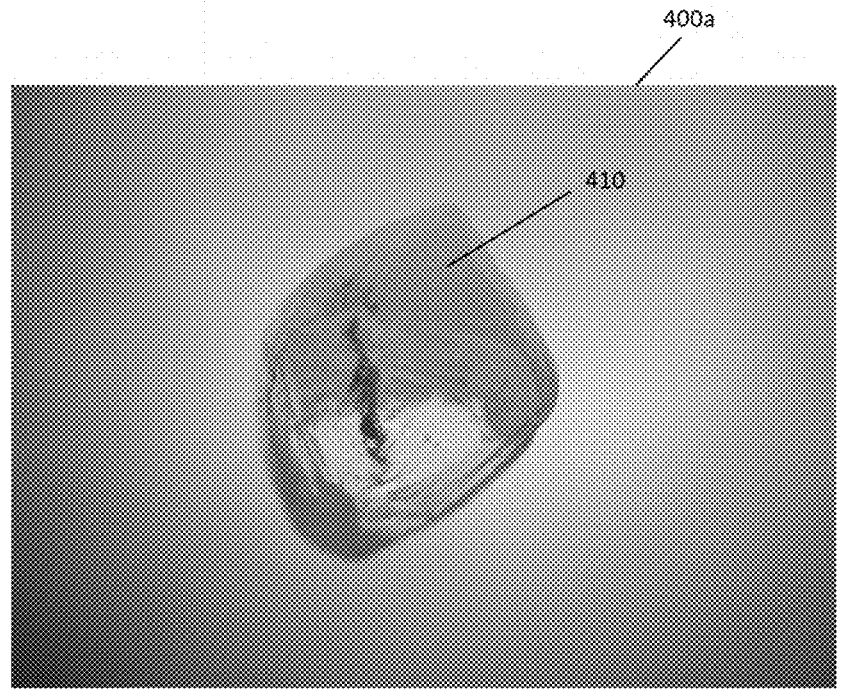
FIG. 4a shows an image without flat-field correction.
Figure 4B:
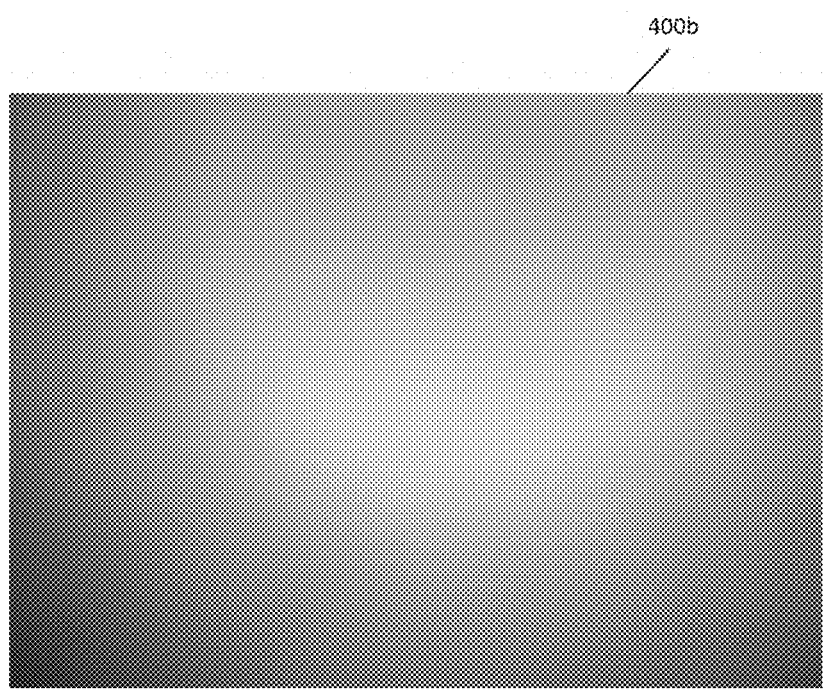
FIG. 4b shows a flat field image.
Figure 4C:
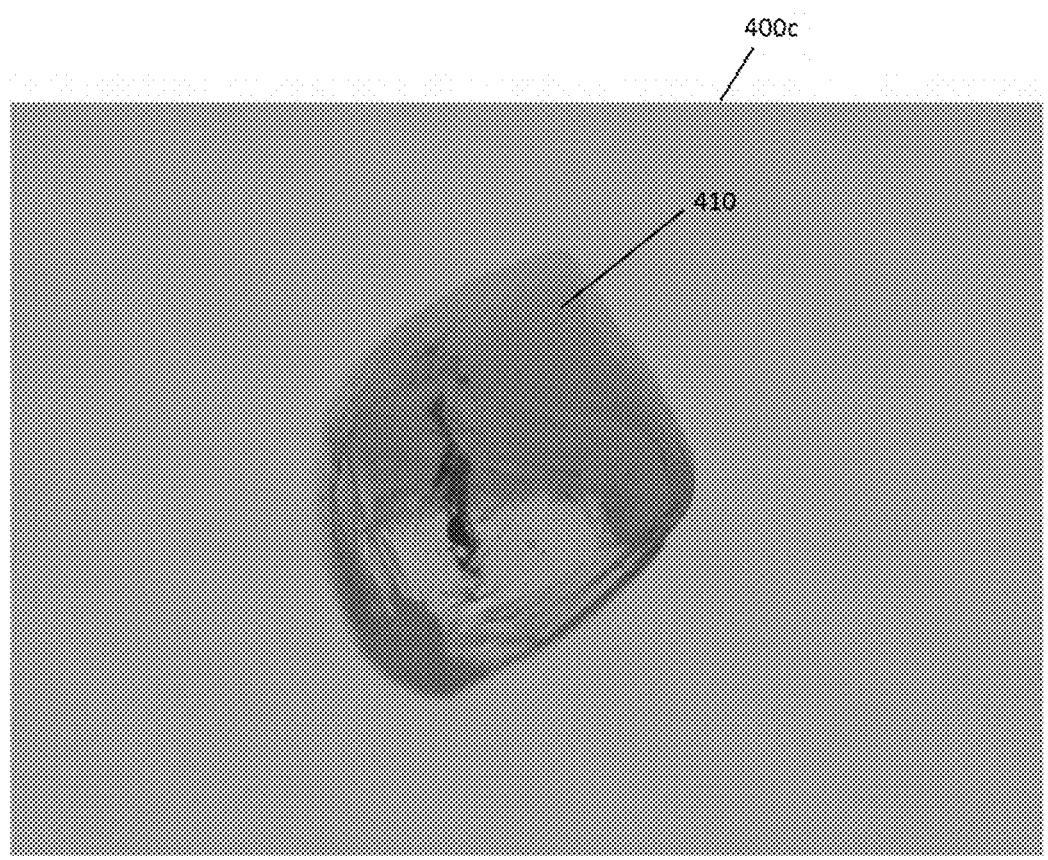
FIG. 4c shows a flat-field corrected image with uniform brightness and background.

Referring to FIGS. 4a, 4b and 4c, there is demonstrated the effectiveness of flat field correction as used in preferred embodiments of the invention.

As is shown, FIG. 4a shows an image 400a including a diamond 410 without flat-field correction. FIG. 4b shows an image 400b which is a flat field image. Now, FIG. 4c shows a flat-field corrected image 400c with diamond 410, which demonstrates an image with uniform brightness and background.

As can be seen, between FIG. 4a and FIG. 4c, with flat field correction, an improved image for analysis and grade determination is shown in FIG. 4c.

Colour is a continuum and an optical impression, and removal of artefact and increased evenness of light provides for more reliable and enhanced colour grading.

Figure 5:
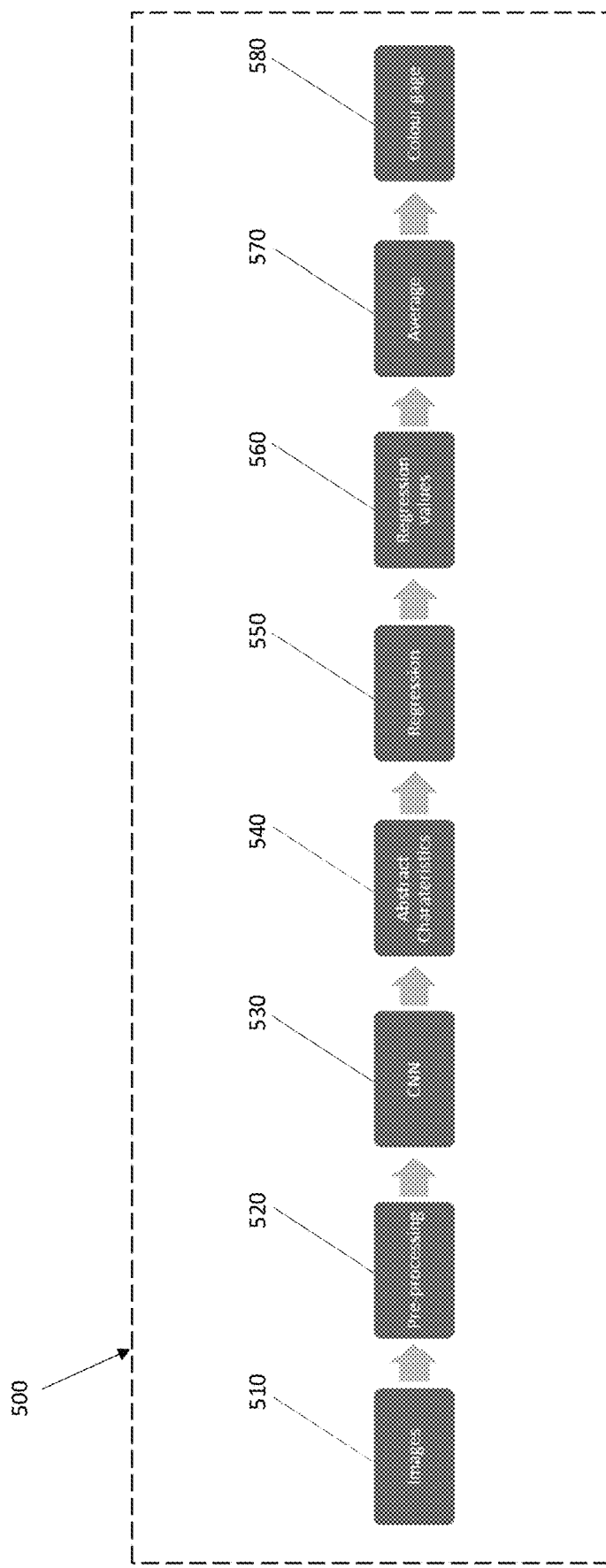
FIG. 5 shows a flow chart of an embodiment of a process according to the present invention.

FIG. 5 shows a flow chart of an embodiment of a process according to the present invention. The process includes the steps of:

Step (i) 510—Capture one or more optical images of at least a portion of a diamond;

Step (ii) 520—Conduct pre-processing to the optical images;

Step (iii) 530—Input the pre-processed images into a pre-trained neural network;

Step (iv) 540—Identify the abstract characteristics of the diamond;

Step (v) 550—Analyze the abstract characteristics by regression method;

Step (vi) 560—Determine the regression values of the one or more optical images of the diamond;

Step (vii) 570—Determine an average of the regression values of the one or more optical images of the diamond; and Step (viii) 580—Determine the colour grade of the diamond.

The process of the present invention, in a preferred embodiment, utilize a system of integrating spheres are used to analyze the colours of diamonds that are developed, and a pre-trained neutral network.

Such a system and process, can provide a good alternative with high repeatability in comparison with the systems and processes of the prior art, as can also reduce the cost and time to produce master stone sets and train a professional gemologist. It can also reduce the time to train a professional gemologist.

Further, it can obviate the necessity to have different sets of master stones for colour assessment of different sizes of diamonds.

Due to the visual nature of colour, the assessment on the colour a diamond needs to be done in a controlled environment. The present invention ensures that the lighting conditions and the background for every diamond assessed for colour are the same, obviating negative environmental effects.

Moreover, the controlled environment must be repeatable at different locations such that people at different location can still have the same assessment on diamond colour.

A system of integrating spheres assists in playing this role as the light intensity, spectrum and uniformity can be well controlled and repeated, and meet this requirement.

What is claimed:

1. A process operable using a computerized system for grading the colour of a diamond using a pre-trained neural network for determination of a colour grading, the computerized system including an optical image acquisition device, a pre-trained neural network and an output module operably interconnected together via a communication link, said process including the steps of:
   (i) acquiring via an optical image acquisition device one or more optical images of at least a portion of a test diamond, wherein the one or more optical images are acquired at a predetermined angle of with respect to the central axis of the test diamond, wherein the central axis extends normal to the table and through the apex of the pavilion of the test diamond and in a direction of towards the table, and wherein the one or more optical images are acquired in an environment having a predetermined constant light level;
   (ii) in a pre-trained neural network, providing a regression value associated with the colour grade of said test diamond based on the one or more optical images of at least a portion of said test diamond acquired during step (i);
   wherein the pre-trained neural network has been pre-trained utilising optical images acquired from a plurality of reference diamonds each having a pre-assigned colour grade assigned thereto,
   wherein said plurality of reference diamonds includes a plurality of reference diamonds of each pre-assigned colour grade,
   wherein of one or more optical images are acquired by an optical image acquisition device of at least a portion of each diamond of said plurality of reference diamonds at the same facets and at the same predetermined angle of with respect to the central axis of the reference diamond, wherein the central axis extends normal to the table and through the apex of the pavilion of the reference diamond as that of (i) and in an environment having a predetermined constant light level the same as that as (i); and
   (iii) from an output module, providing a colour grade to the test diamond of (i) by correlating the regression value from (ii) to a colour grade.

2. The process according to claim 1, wherein the one or more optical images of at least a portion of a test diamond is acquired in a direction of towards the table of the test diamond in step (i), and wherein the pre-trained neural network has been pre-trained utilising optical images acquired from said plurality of reference diamonds each having a pre-assigned colour grade assigned thereto in a direction of towards the table of the reference diamond.

3. The process according to claim 1, wherein the one or more optical images of at least a portion of a test diamond is acquired in a direction of towards the pavilion of the test diamond in step (i), and wherein the pre-trained neural network has been pre-trained utilising optical images acquired from said plurality of reference diamonds each having a pre-assigned colour grade assigned thereto in a direction of towards the pavilion of the reference diamond.

4. The process according to claim 1, wherein the one or more optical images of at least a portion of a test diamond is acquired in a direction of towards the table of the test diamond and is acquired in a direction of towards the pavilion of the test diamond in step (i), and wherein the pre-trained neural network has been pre-trained utilising optical images acquired from said plurality of reference diamonds each having a pre-assigned colour grade assigned thereto in a direction of towards the table of the reference diamond and in a direction of towards the pavilion of the reference diamond.

5. The process according to claim 1, wherein the one or more images of the test diamond of (i) and the one or more images of the plurality of the reference diamonds of (ii) is the entire view of the test diamond and the reference diamond within field of view.

6. The process according to claim 1, wherein the one or more images of the test diamond of (i) and the one or more images of plurality of reference diamonds of (ii) are acquired at an angle in the range of from zero degrees to 90 degrees with respect to corresponding central axis to each of the plural diamonds, wherein a plurality of the one or more images of the test diamond of (i) and the one or more images of the plurality of reference diamonds of (ii) are acquired about respective central axis, and wherein one or more images of the test diamond of (i) and the one or more images of the plurality of reference diamonds of (ii) are acquired at equally spaced angles about said corresponding central axis to each of the plural diamonds.

7. The process according to claim 1, wherein the one or more images of the test diamond of (i) and the one or more images of the plurality of reference diamonds of (ii) are acquired at an angle of inclination in the range of from 40 degrees to 50 degrees with respect to the respective central axis.

8. The process according to claim 1, wherein at least a first optical image of the test diamond and the optical images of the plurality of reference diamonds are acquired within a system of a pair of integrating spheres.

9. The process according to claim 1, wherein the pre-assigned colour grades of the plurality of diamonds are standard reference colour grades of diamonds corresponding to a pre-existing colour grading system.

10. The process according to claim 9 wherein the pre-existing colour grading system is the Gemological Institute of America (GIA) colour grading system.

11. The process according to claim 1, wherein the one or more images of the test diamond of (i) are resized and cropped prior to being received by the neural network such that the images have a constant size and resolution to each other.

12. The process according to claim 1, wherein the one or more images of the plurality of reference diamonds of (ii), are resized and cropped prior to being received by the neural network such that the images have a constant size and resolution to each other.

13. The process according to claim 1, wherein flat field correction is utilized in the acquisition of the one or more images of the test diamond of (i) and the one or more images of the plurality of the reference diamonds of (ii).

14. A computerized system for grading the colour of a diamond using a pre-trained neural network for determination of a colour grading, the computerized system including:
   a first optical image acquisition device for acquiring one or more optical images of at least a portion of a test diamond, wherein the one or more optical images are acquired at a predetermined angle of with respect to the central axis of the test diamond, wherein the central axis extends normal to the table and through the apex of the pavilion of the test diamond and in a direction of towards the table, and wherein the one or more optical images are acquired in an environment having a predetermined constant light level;
   a pre-trained neural network for receiving one or more optical images of at least a portion of the test diamond from the first optical image acquisition device, and providing a regression value associated with the colour grade of said test diamond based on the one or more optical images of at least a portion of said test diamond;

wherein the pre-trained neural network has been pre-trained utilising optical images acquired from a plurality of reference diamonds each having a pre-assigned colour grade assigned thereto, and wherein said plurality of reference diamonds includes a plurality of diamonds of each pre-assigned colour grade; and wherein of one or more optical images is acquired by a second optical image acquisition device of at least a portion of each diamond of said plurality of reference diamonds at the same facets and at the same predetermined angle of with respect to the central axis, wherein the central axis extends normal to the table and through the apex of the pavilion of the reference diamond and in a direction of towards the table and in an environment having a predetermined constant light level the same as that as when the one or more optical images of at least a portion of a test diamond is acquired; and an output module in communication with the pre-trained neural network, for providing a colour grading to the test diamond by correlating said regression value to a colour grade.

15. The computerized system according to claim 14, wherein the first and second optical image acquisition devices are inclined at an angle in the range of from zero degrees to 90 degrees with respect to the respective central axis.

16. The computerized system according to claim 14, wherein the first and second optical image acquisition devices are inclined at an angle of about 45 degrees with respect to the respective central axis.

17. The computerized system according to claim 14, wherein the first and second optical image acquisition devices are located at a distance of in the range of 100 mm and 300 mm from the corresponding diamond.

18. The computerized system according to claim 14, further comprising at least one light source for providing said predetermined constant light level is of colour temperature 6500K.

19. The computerized system according to claim 14, further comprising at least one light source and wherein the light source is selected from the group including a LED (Light Emitting Diode) light source, a Xeon lamp light source, an incandescent light source, a fluorescent lamp light source, and a solar simulator.

20. The computerized system according to claim 14, further comprising a system of a pair integrating spheres, wherein the integrating spheres comprised of two integrating spheres in optical communication with each other at aperture region in which the test diamond is located when the one or more images of the diamond is acquired, and wherein the test diamond is located at an aperture interconnecting each sphere of the integrating sphere system, and wherein a light source is provided in each of the spheres.

21. The computerized system according to claim 20, further comprising a rotational platform rotatable about said central axis and within the system of a pair of integrating spheres, wherein the rotational platform provides for rotation of the test diamond about the central axis such that a plurality of optical images of the test diamond can be acquired by the first optical image acquisition device.

22. The computerized system according to claim 20, wherein the first optical image acquisition device is disposed within a first sphere of the system of a pair of integrating spheres and inclined towards said aperture region.

23. The computerized system according to claim 20, wherein the first optical image acquisition device is disposed within a second sphere of the system of a pair of integrating spheres and inclined towards said aperture region.

* * * * *